US007722300B1

(12) United States Patent  (10) Patent No.: US 7,722,300 B1
Corcoran  (45) Date of Patent: May 25, 2010

(54) CHUCK WITH INTERNAL GEARED TIGHTENING MECHANISM

(76) Inventor: Jerry Alvin Corcoran, 1586 N. Redwood St., Canby, OR (US) 97013

( * ) Notice: Subject to any disclaimer, the term of this patent is extended or adjusted under 35 U.S.C. 154(b) by 1016 days.

(21) Appl. No.: 11/452,661

(22) Filed: Jun. 13, 2006

(51) Int. Cl.
*B23B 31/169* (2006.01)
(52) U.S. Cl. .................... 408/240; 279/62; 279/902
(58) Field of Classification Search .......... 279/60–62, 279/147, 150, 902; 408/240; *B23B 31/169*
See application file for complete search history.

(56) References Cited

U.S. PATENT DOCUMENTS

| | | | | |
|---|---|---|---|---|
| 4,260,169 | A * | 4/1981 | Hall | 279/62 |
| 4,284,285 | A * | 8/1981 | Futter | 279/62 |
| 5,172,923 | A * | 12/1992 | Nakamura | 279/62 |
| 6,616,148 | B1 * | 9/2003 | Corcoran | 279/62 |
| 6,848,691 | B2 * | 2/2005 | Yang et al. | 279/62 |
| 7,455,303 | B2 * | 11/2008 | Draudt et al. | 279/63 |
| 2006/0055126 | A1 * | 3/2006 | Nachev | 279/60 |

FOREIGN PATENT DOCUMENTS

CN 201091927 Y * 7/2008

* cited by examiner

*Primary Examiner*—Eric A Gates
(74) *Attorney, Agent, or Firm*—Mark S. Hubert (57) ABSTRACT

An internally geared chuck that can generate sufficient torque to ensure adequate jaw gripping or jaw releasing force regardless of whether it is used in a keyless or key enabled chuck version. The key enabled version encompasses an internally housed, spring retracted chuck key that may be enabled to add additional torque to tighten or loosen the jaws when so required. The key enabled version may be operated with simple hand tightening in a keyless mode. The second embodiment has two levels of keyless operation. By drawing together elements of the chuck, a mechanical gearing advantage may be realized to add additional torque. In both embodiments all of the various sized and configured gears are housed within the chuck body.

6 Claims, 9 Drawing Sheets

CHUCK WITH INTERNAL GEARED TIGHTENING MECHANISM

BACKGROUND OF THE INVENTION

The present invention relates to a tool chuck, and more particularly relates to an improvement in construction of a chuck for firmly holding a tool such as a drill bit or a driver bit of electric work devices. This invention relates to a chuck for use with rotating equipment such as drills. Such rotating equipment is commonly driven manually or in the case of power drivers, electrically, hydraulically or pneumatically. More particularly, the present invention relates to a style of chuck which may be keylessly tightened or loosened by hand, or can alternatively, be tightened or loosened by rotation of a twist key which can be engaged by partial extraction from within a key recess about the periphery of the chuck body. The mechanical gearing is located within the interstitial void of the chuck body and through a series of gear reductions, offers mechanical advantage to increase the torque that is applied to the jaws in the tightening and loosening process.

Both hand and powered tool drivers are well known. The general configuration is a rear rotational driver, mechanically coupled to a chuck by threaded engagement or via a tapered sleeve that mates into a corresponding recess in the chuck body. The chuck has any number of circumferentially equally spaced jaws that are advanced concurrently both axially outward and radially inward from a front orifice. It is the advancement of these jaws that grip a tool or bit. The chuck may be used to hold any one of a multitude of tools such as screw or nut drivers and cutting, shaping or grinding bits, although the most common is a twist drill. With such a diverse selection of tool bits, the diameters and configurations of the shanks vary considerably from circular to polygonal in cross section. For this reason the chuck is adjustable over a relatively wide range.

Numerous chucks have been developed and are well known in the art. The most common type is found on the household hand drill. This is perhaps the most simple configuration with three jaws approximately spaced circumferentially 120 degrees apart from each other. Each jaw is housed in an angularly disposed passageway in the chuck body configured so that rotation of the chuck body in one direction with respect to a constrained nut engaging the jaws forces the jaws into gripping relationship with the tool bit. Counter rotation acts to release the gripping relationship. The rotation is commonly accomplished through the use of a key. If sufficient torque can be developed by hand rotation of the chuck, i.e. enough torque to hold the tool bit such that the rotating tool may be used without the disengagement or loosening of the tool bit from the jaws of the chuck, a key is not necessary. This is known as a "keyless" chuck, and the act of securing a tool bit in this manner is known as "keyless" operation. This is a desirable configuration in that bits can be quickly removed or inserted and lost or damaged keys do not hinder the process.

In the current state of the art, key and keyless chucks both have several disadvantages. First, if they require a key, it is made of a specific size as all keys are not interchangeable. Keys are easily lost and the engagement teeth can become stripped. Replacement keys can often be hard to find. Second, this type of tightening is slow as it requires insertion and separate tightening at different axial positions around the chuck. If it is a keyless chuck it often does not hold the tool bit secure enough for arduous operations, or conversely it holds the tool bit too firm such that hand release of the bit is extremely difficult. The disadvantages of the keyed and keyless chucks are in direct opposition to their respective advantages. It would be desirable to have a style of keyless chuck that offers additional torque to secure or release the tool bit. It would also be advantageous to have a style of chuck that has a key that can't be lost or that does not slip off of the outer, planar tightening ring gear because of minimal teeth engagement.

The present invention resolves all of these drawbacks in the existing chucks and just as importantly, has cleaner aesthetics. By housing the planar tightening ring gear and tightening mechanism inside the chuck's nose cone, these gears can be lubricated with oil or grease without fear of spreading it onto the user, and the gears are protected from chipping. By utilizing a second planar gear in the tail section of the chuck that can be brought into use to increase the torque, the present invention offers significant increases in user friendliness.

SUMMARY OF THE INVENTION

In accordance with the invention, a keyless and keyed chuck include a set of different sized spur gears housed within the chuck body, that when matingly engaged and rotated, offer mechanical advantage in the form of an increase in the torque available to rotate the beveled planar ring gear that turns the screw ring to advance or retract the chuck jaws.

The first embodiment utilizes this design in a retractable key chuck and the second embodiment utilizes this design in a keyless variation of the chuck. The second variation also utilizes a second mirror imaged beveled planar ring gear and spur gear mated to the first spur gear by a smaller pinion spur gear in the tail section of the chuck body. This second planar gear can be brought into play by moving the chuck body and tail piece into closer relative proximity. When engaged, because of a variation in diameters of the spur gears, requires more twisting to tighten or loosen the jaws, but increases the mechanical advantage or the amount of torque that can be generated when hand tightening.

Accordingly, it is an object of the present invention to provide an improved keyless chuck with the ability to gain additional mechanical advantage to tighten or loosen the jaws.

It is a further object of the present invention to provide an improved twist key chuck with the ability to gain additional mechanical advantage to tighten or loosen the jaws.

It is yet another object of the present invention to provide an improved chuck that eliminates the necessity of a separate key.

It is still a further object of the present invention to provide an improved keyless chuck capable of exerting an increased tightening torque over conventional chucks.

It is a final object of the present invention to provide an improved chuck that has new aesthetics with a cleaner exterior by virtue of it's internally housed geared tightening mechanics.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

The present invention relates to a drill chuck that utilizes a new jaw tightening mechanism that offers increased torque to advance or retract the chuck jaws and is housed within the chuck body's interstitial void. It's simplistic design may be utilized with both keyed and keyless chuck adaptations.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings.

The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
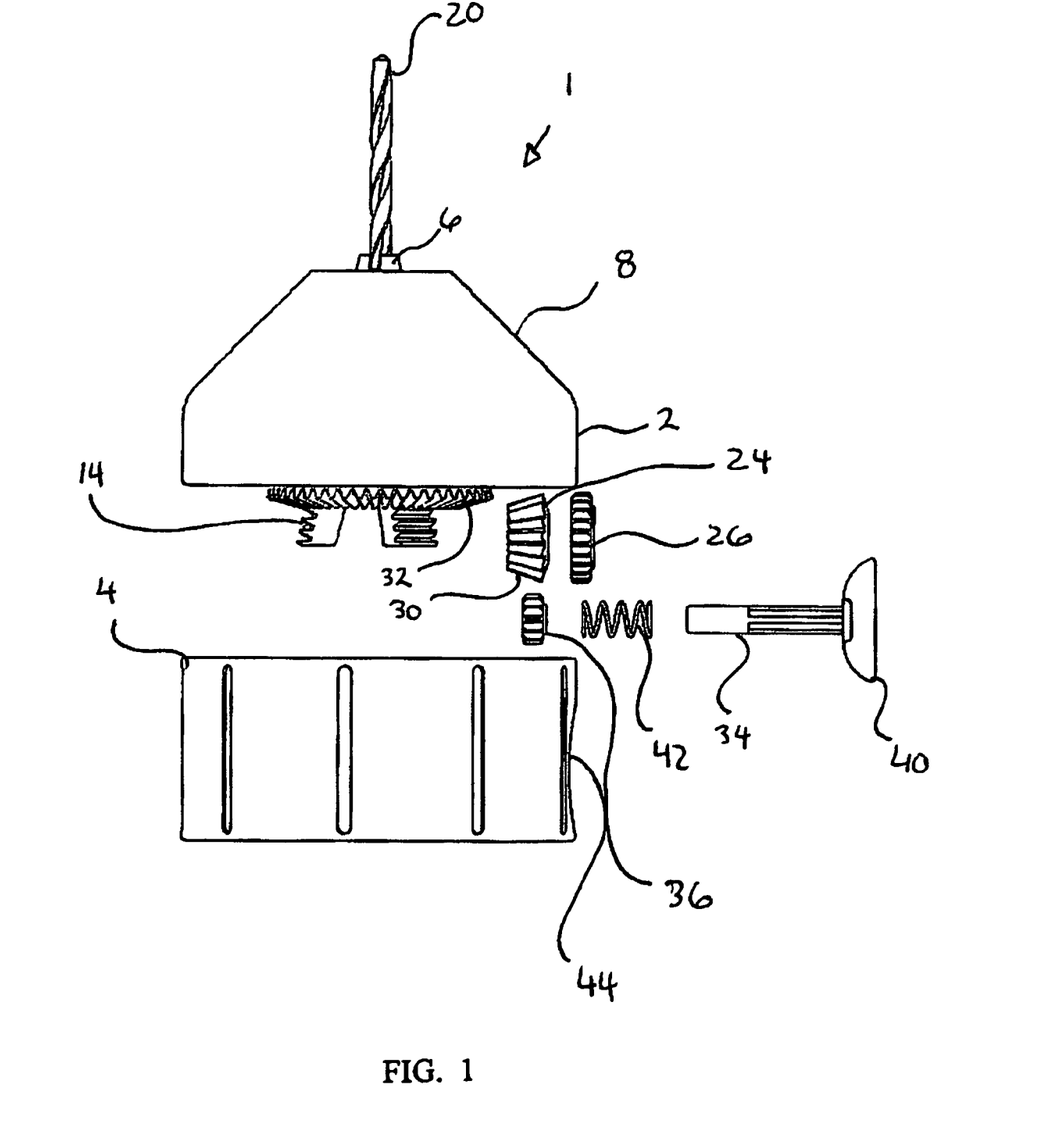
FIG. 1 is an exploded view the twist key chuck with the chuck body separated from the tail section interface.

The chuck apparatus according to the preferred embodiment of the present invention comprises a chuck body 2, and a tail section 4. Referring to FIG. 1, an exploded view the twist key chuck with the chuck body separated from the tail section interface, and FIG. 3. a cross sectional view of the twist key chuck with the twist key retracted into the mating recess the components of the twist key chuck 1 can best be seen. Twist key chuck 1 is comprised of chuck body 2 which is rotatably connected to tail section 4. Chuck body 2 has a cylindrical configuration terminating in a frusticonical face 8. Jaws 6 extend axially from chuck body 2. There are three jaw passages 10 bored inclinedly through chuck body 2 and are in communication with central void 12. Jaw passages 10 are oriented so as to be converging passages and are spaced approximately angularly equidistant about the longitudinal axis of chuck body 2 and tail section 4. Jaws 6 are of a generally cylindrical configuration with rack teeth 14 and tapered faces 16 located on the exterior longitudinal surface. The jaws 6, are located approximately 120 degrees apart. Jaws 6 reside in jaw passage 10 oriented such that rack teeth 14 face into central void 12 of chuck body 4 at an acute angle with respect to the longitudinal axis of chuck body 2. Threaded ring 18 frictionally fits into central void 12 at the chuck body/tail section interface. The thread on the threaded ring 18 extends to engage the rack teeth 14. This threaded ring 18 although illustrated as formed on the inner periphery of beveled planar ring gear 22, may be independently housed within a groove in the chuck body about the axial bore at a location where the jaw teeth are exposed, as is commonly known in the art. Twisting chuck body 2 about the longitudinal axis of the chuck body drives the jaws 6 inclinedly forward and thus inward toward the longitudinal axis of the chuck body 2 to grip any tool bit 20.

Figure 3:
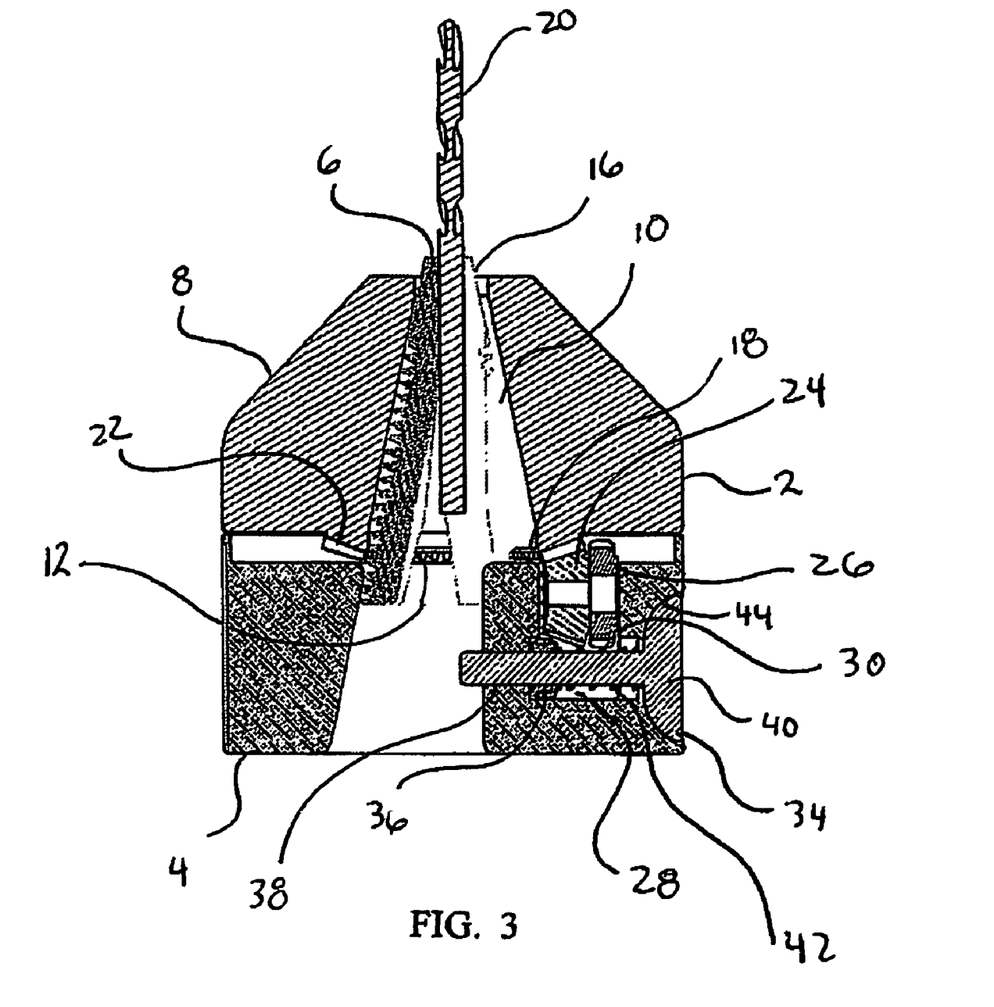
FIG. 3 is a cross sectional view of the twist key chuck with the twist key retracted into the mating recess.

A first upper beveled planar ring gear 22 is mechanically affixed to the rear of the chuck body 2 such that it's planar axis resides perpendicular to the longitudinal axis of the chuck body. Ring gear 22 rotates in unison with chuck body 2. Beveled spur gear 24 is rigidly mated to large pinion gear 26 such that their central origins are aligned. They are rotatably housed in component void 28 of the tail section 4 and the beveled spur gear teeth 30 are meshingly engaged with the beveled planar ring gear teeth 32. Twist key 34 is a longitudinal cylindrical shaft with small pinion gear 36 affixed thereto. The distal end of twist key 34 resides rotatably mounted in cylindrical recess 38. The proximate end of twist key 34 is formed into thumb plate 40. Coil compression spring 42 resides between pinion gear 36 and the wall of tail section 4 that defines component void 28. The compressive forces generated by spring 43 retain pinion gear 36 out of engagement with large spur gear 26 and force twist key 34 fully into the component void 28 with thumb plate 40 residing in plate recess 44.

Figure 2:
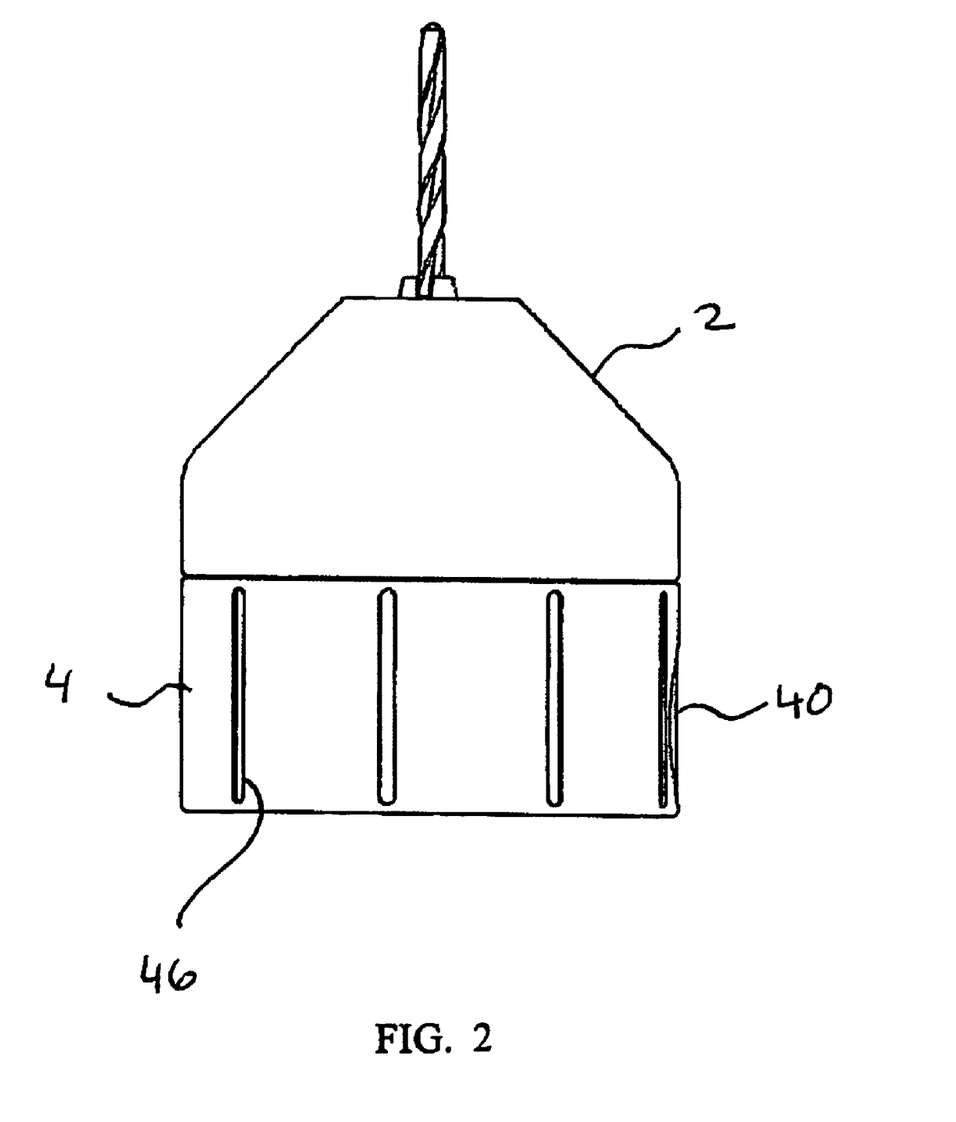
FIG. 2 is a perspective view of the twist key chuck with the twist key retracted into the mating recess.
Figure 4:
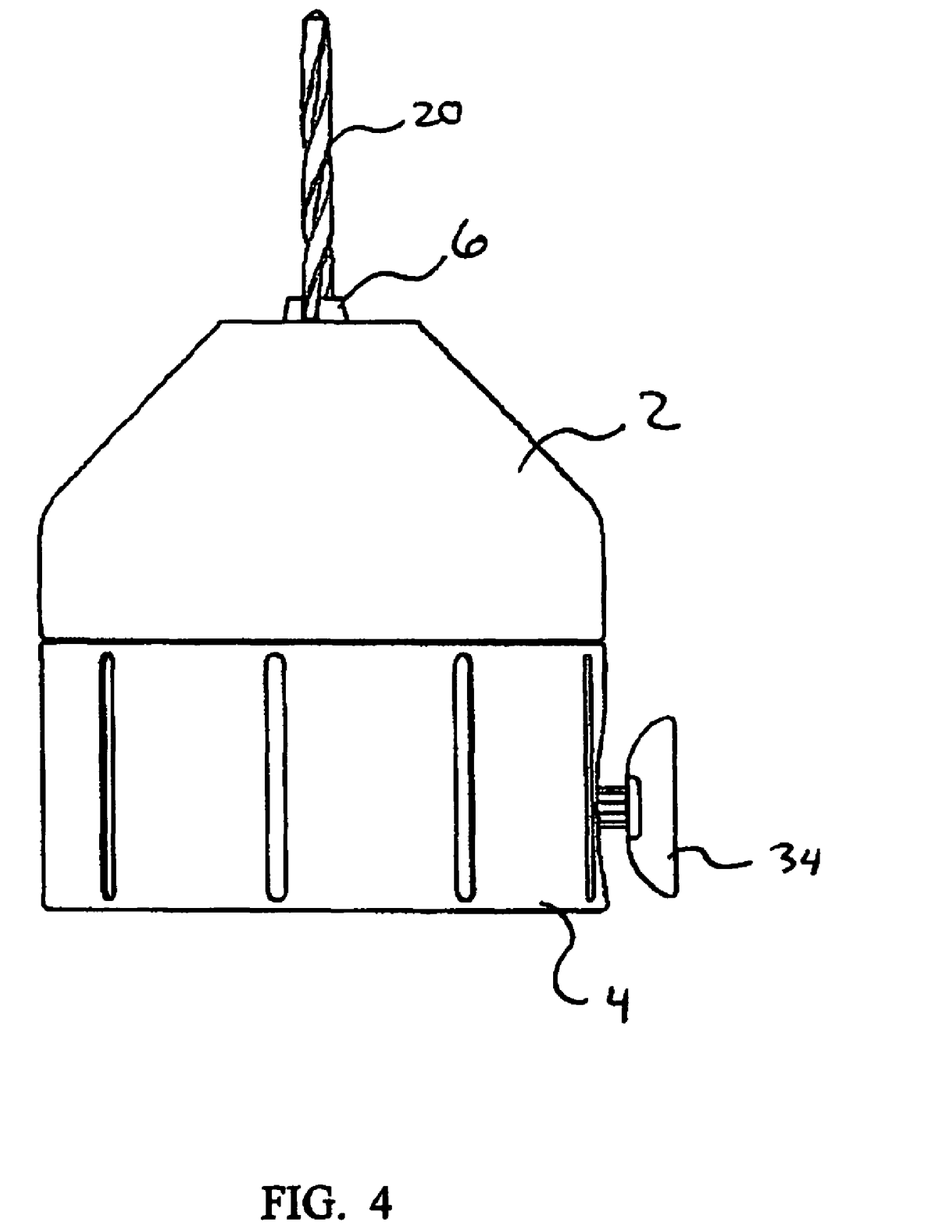
FIG. 4 is a perspective view of the twist key chuck with the twist key extended from the mating recess.

FIG. 2 shows the twist key chuck 1 with the twist key 40 fully retracted. Grip ribs 46 can be seen on the exterior of tail section 4. FIG. 4 shows the twist key chuck 1 with the twist key 40 fully extended against the compression forces of coil spring 42.

Figure 5:
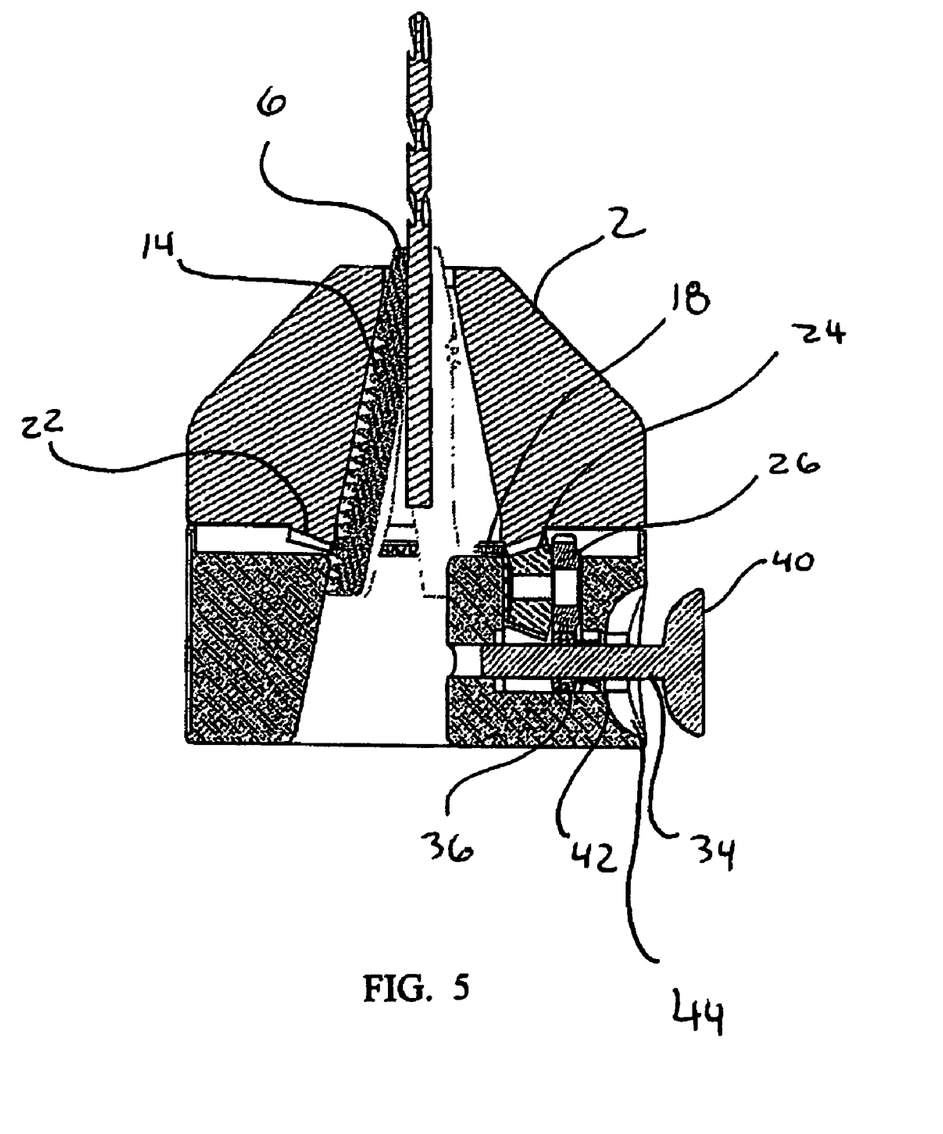
FIG. 5 is a cross sectional view of the twist key chuck with the twist key extended from the mating recess.

FIG. 5, a cross sectional view of the twist key chuck with the twist key 34 extended from the mating recess, illustrates the operation of the twist key chuck 1 best. When the operator grips thumb plate 40 and extracts twist key 34 against the pressure of coil spring 42, pinion gear 36 meshingly engages it's mating counterpart large pinion gear 26. When the twist key 34 is rotated pinion gear 36 rotates large pinion gear 26 and beveled spur gear 24 which rotates first upper beveled planar ring gear 22, threaded ring 18 and chuck body 2. The engagement between threaded ring 12 and rack teeth 14 drive jaws 6 in a linear fashion about the longitudinal axis of the chuck body 2. This action tightens or loosens the jaws 6 about the tool bit 20. The differing ratio of diameters between the smaller pinion gear 36 and large pinion gear 26 offers the mechanical advantage of increased torque. When the thumb plate 40 is released it is retracted back into plate recess 44.

It is to be noted that this embodiment does not require the use of the twist key 34 to grip a work bit in its jaws as it may be operated in the manner of a conventional keyless chuck. The twist key 34 simply offers additional torque beyond what is available by keyless hand tightening, to tighten or loosen tool bits.

The alternate embodiment of the present invention, the dual action keyless chuck with internal geared tightening mechanisms 50, utilizes an elongated chuck body 52 and a twistable tail piece 54 connected so as to form a central void 56 that houses the jaw operating mechanisms therein. There is an upper and lower planar beveled ring gear arrangement that allows the jaws 6 to be operated by rotating the chuck body 52 or allows the jaws to be operated with additional torque by then rotating both the chuck body 52 and the tail piece 54 in unison.

Figure 6:
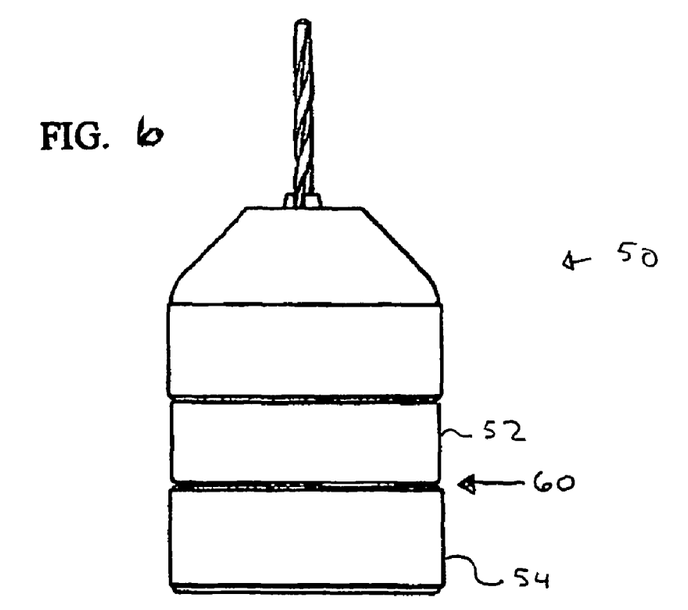
FIG. 6 is a perspective view of the keyless chuck in the non engaged position.
Figure 7:
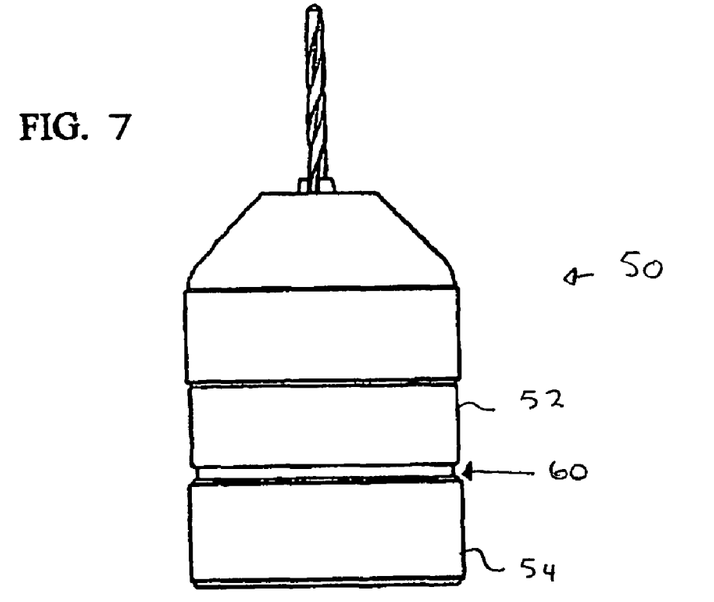
FIG. 7 is a perspective view of the keyless chuck in the engaged position.

FIG. 7 shows a perspective view of the keyless chuck 50 with only the upper ring gear engaged for jaw operation. FIG. 6 shows a perspective view of the keyless chuck 50 with both the upper and lower ring gears engaged for additional torque. The gap 60 between chuck body 52 and tail piece 54 in FIG. 7 is much larger than the gap 60 seen in FIG. 6. In FIG. 6 tail piece 54 has been pulled upward toward the chuck body 52.

Figure 8:
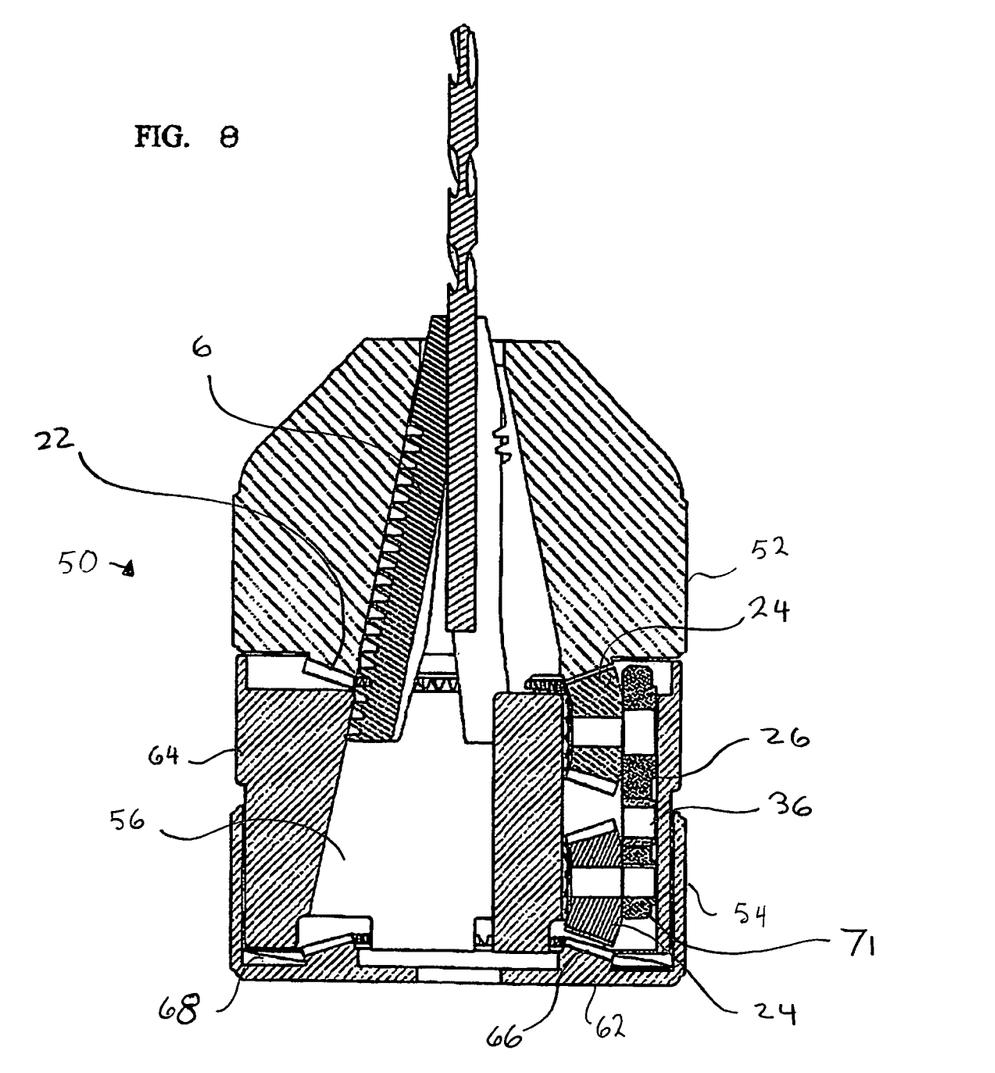
FIG. 8 is a cross sectional view of the keyless chuck in the non engaged position.
Figure 10:
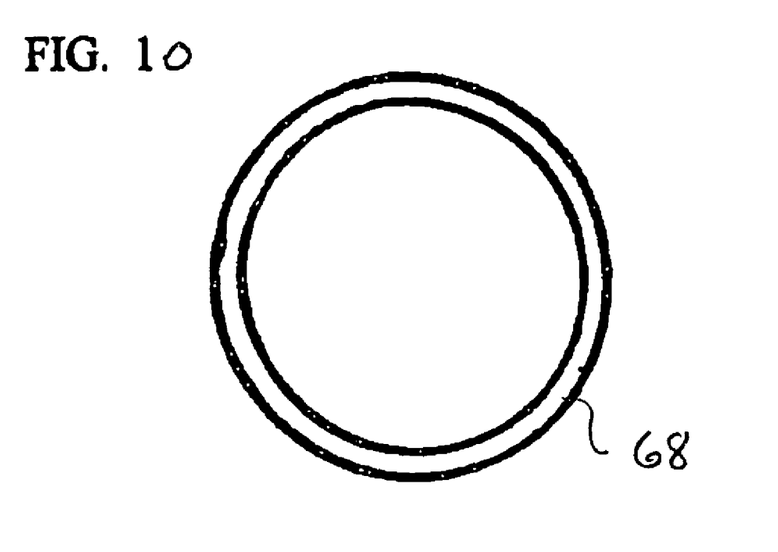
FIG. 10 is top view of the wave spring.
Figure 11:
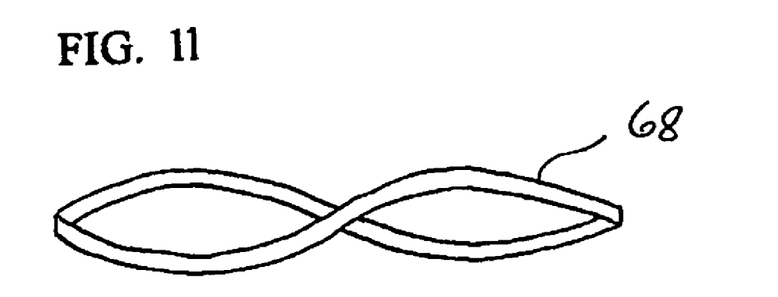
FIG. 11 is a side view of the wave spring.

Looking at FIG. 8 a cross sectional view of the keyless chuck 50 with only the upper ring gear 22 engaged, the internal components can best be seen. Elongated chuck body 52 is essentially the mechanical equivalent of chuck body 2 in the preferred embodiment. The twistable tail piece 54 is comprised of end cap 62 and gear housing 64. End cap 62 has a lower planar beveled ring gear 66 substantially similar to the upper beveled planar ring gear 22 but orientated so that their teeth face each other. The inside diameter of the end cap 62 is sized slightly larger than the outside diameter of the bottom section of gear housing so as to accept the cylindrical gear housing 64 and allow rotational or axial movement. A wave spring 68 separates the end cap 62 from the gear housing. FIG. 10 shows the generally circular shape of the wave spring 68 as viewed from a top perspective. FIG. 11 shows a side view of the wave spring 68 wherein the non-planar configuration can be seen. It is known that this type of spring, i.e. one designed to work in compression only, is best suited for this application although numerous other spring designs would work equally as well (such as a bellville washer).

Figure 9:
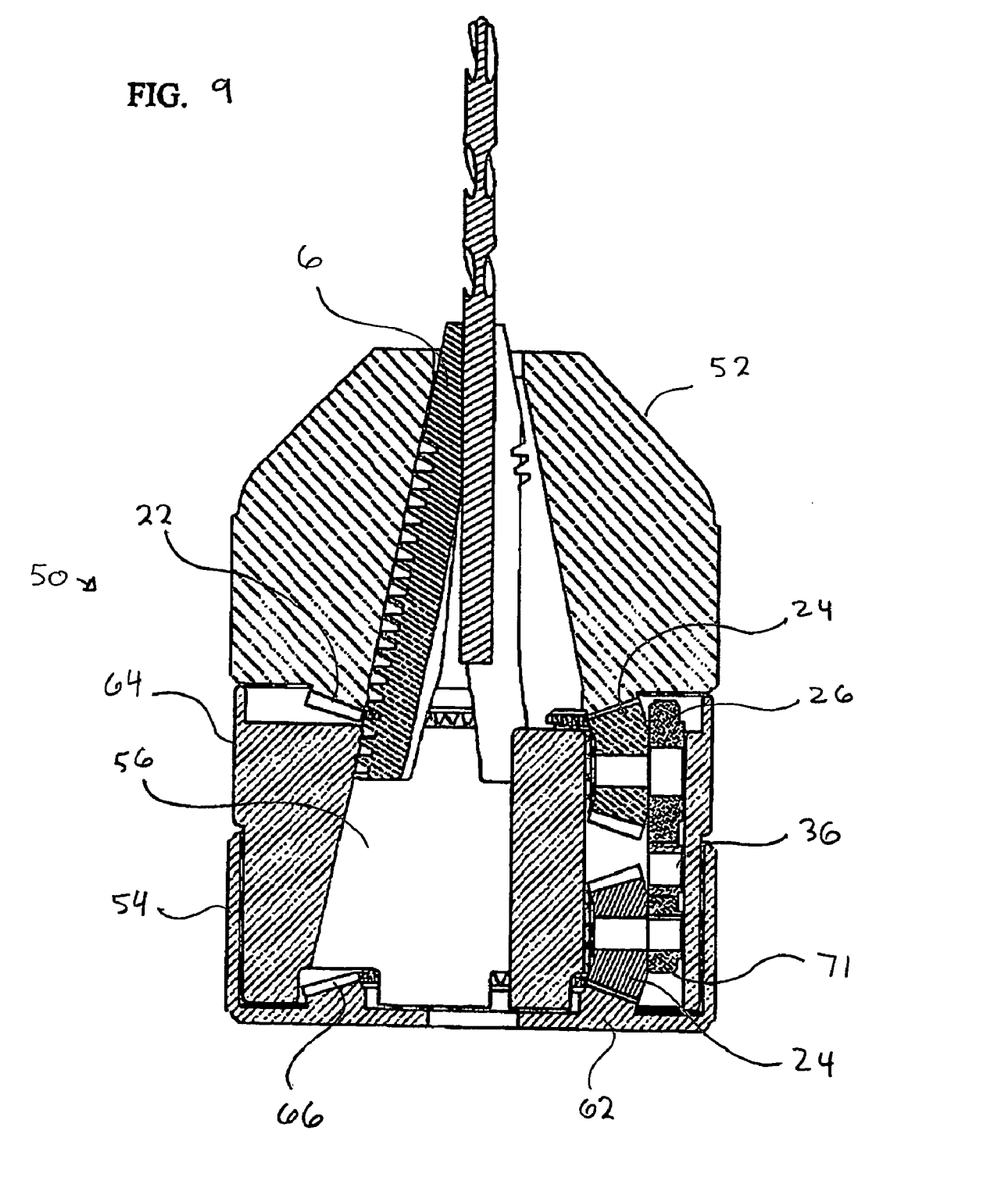
FIG. 9 is a cross sectional view of the keyless chuck in the engaged position.

Looking at FIG. 8 or 9 it can be seen that gear housing 64 is similar in design to that of tail piece 4 in that they both have internal voids in which the gear tightening mechanisms are installed. Gear housing 64 has beveled spur gear 24 rigidly mated to large pinion gear 26 such that their central origins are aligned and the beveled spur gear teeth 30 meshingly engage the beveled planar ring gear teeth 32. Gear housing 64 has a second beveled spur gear 71 rigidly mounted to small pinion gear 70 so that their central origins are aligned. This small pinion gear 70 is located in direct planar alignment with large pinion gear 26 and the two pinion gears are mechanically coupled via an intermediate pinion gear 36 that resides between the two such that the teeth of all three gears are meshingly engaged. In operation, when the operator grips chuck body 2 and rotates gear housing 64 with respect to the chuck body 2, small pinion gear 70, large pinion gear 26, intermediate pinion gear 36, and both beveled spur gears 24 and 71 interconnectingly rotate. Since the top beveled spur gear 24 is matingly engaged with top planar ring gear 22, the rotational engagement between threaded ring 12 and rack teeth 14 drive jaws 6 in a linear fashion as described above to tighten or loosen the jaws 6 about the tool bit 20. Note that with wave spring 68 relaxed the bottom planar ring gear 66 is not engaged with the lower beveled spur gear.

With the wave spring 68 in it's uncompressed or relaxed state, the physical separation between end piece 54 and chuck body 52 can be maintained and is visually perceptable by the size of gap 60 as shown in FIG. 8. When the tail piece 54 is forced upward about it's longitudinal axis toward chuck body 52 to compress wave spring 68, the gap 60 narrows and the bottom beveled spur gear 24 engages the bottom planar beveled ring gear 66 as can be seen in FIG. 9. Now the chuck body 52 and the tail piece 54 can simultaneously be rotated with respect to each other. Note, that because of the size difference between the large pinion gear 26 and the small pinion gear 70 additional mechanical advantage is provided to the operator to tighten or loosen with increased torque beyond what can be developed without the compression of the wave spring 68 and engagement of the lower spur gear 24 with the lower planar beveled ring gear 66.

The amount of mechanical advantage or torque available to tighten or loosen the jaws of the various chuck embodiments is determined through the gearing ratios, configurations and designs of the pinion gear, idler gear, planar ring gears and twist key (chuck key) as is well known in the industry.

While a preferred embodiment of the present invention and an alternate embodiment has been shown and described, it will be apparent to those skilled in the art that many changes and modifications may be made without departing from the invention in its broader aspects. The appended claims are therefore intended to cover all such changes and modifications as fall within the true spirit and scope of the invention.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

What is claimed is:

1. An internally geared chuck capable of keyless operation comprising: an axially bored chuck body with a forward end and a rear end and a plurality of jaw passages formed therein and inclined axially forward to intersect said axial bore in an angularly spaced arrangement; a plurality of jaws with gear teeth formed thereon and slideably positioned in said jaw passages; an upper beveled tooth planar ring gear formed on a face of said chuck body rear end wherein said face resides normal to and about said axial bore; an internal tooth formed on the inner periphery of said beveled tooth planar ring gear wherein said internal tooth has rotational dependence with said jaw teeth; a cylindrical tail section fixedly attached to the rear section of said chuck body having an axial bore therethrough and an internal gear void formed therein; an upper beveled tooth spur gear mated to an upper pinion gear so as to share a common rotational axis and form a gear set which is rotatably mounted within said gear void and wherein said upper beveled tooth spur gear is meshingly engaged and rotatably connected to said upper beveled tooth planar ring gear; a wave spring; an end cap slidably mounted about said tail section and held in a compressible linear configuration with said tail section by said wave spring; a lower beveled tooth planar ring gear formed on a bottom surface of said end cap wherein said face resides normal to and about said axial bore; a lower beveled tooth spur gear mated to a lower pinion gear so as to share a common rotational axis and form a gear set which is rotatably mounted within said gear void; and an intermediate pinion gear rotatably mounted within said internal gear void and rotatably engaged between said upper pinion gear and said lower pinion gear; where manual rotation of said tail section about the axis of said chuck body with respect to said chuck body when said end cap is slidably positioned about said tail section so that said wave spring is uncompressed and said lower beveled tooth spur gear is not meshingly engaged with said lower beveled tooth planar ring gear, will enable sliding movement of said jaws within said jaw passages with enough force to grip a tool bit for operational rotation.

2. The chuck of claim 1 wherein said lower pinion gear has a diameter that is smaller than a diameter of said upper pinion gear.

3. The chuck of claim 2 wherein said end cap may be slidably positioned about said tail section so as to compress said wave spring and meshingly engage said lower beveled tooth spur gear with said lower beveled tooth planar ring gear for rotatable connection so as to allow said chuck body to rotate in response to manual rotation of said tail section with respect to said chuck body and said end cap to enable sliding movement of said jaws within said jaw passages with an increased torque.

4. The chuck of claim 3 wherein said chuck is a drill chuck.

5. The chuck of claim 1 wherein said tail section of said chuck body is adapted for receiving a driven shaft.

6. The chuck of claim 1 wherein said tail section of said chuck body is adapted for receiving a driven shaft of a drill.

* * * * *